United States Patent [19]

Haramoto et al.

[11] Patent Number: 5,701,758
[45] Date of Patent: Dec. 30, 1997

[54] REFRIGERATION SYSTEM ACCUMULATING VESSEL HAVING A BRAZED, METAL-CLAD DEFLECTOR

[76] Inventors: Cary Haramoto, 108 Pamela La., Newark, N.Y. 14513; Tom C. Wilson, 104 Elm St., Booneville, Miss. 38829

[21] Appl. No.: 700,948

[22] Filed: Aug. 21, 1996

[51] Int. Cl.⁶ .................... F25B 43/00; B01D 45/08
[52] U.S. Cl. .................... 62/503; 29/890.06; 55/463
[58] Field of Search ................ 62/50, 509, 512, 62/298; 55/192, 463, 387; 29/890.06

[56] References Cited

U.S. PATENT DOCUMENTS

| | | |
|---|---|---|
| 3,200,568 | 8/1965 | McNeil . |
| 4,041,728 | 8/1977 | Morse et al. . |
| 4,111,005 | 9/1978 | Livesay . |
| 4,182,136 | 1/1980 | Morse . |
| 4,194,371 | 3/1980 | Morse . |
| 4,199,960 | 4/1980 | Adams et al. . |
| 4,208,887 | 6/1980 | Morse et al. . |
| 4,291,548 | 9/1981 | Livesay . |
| 4,458,505 | 7/1984 | Griffin . |
| 4,474,035 | 10/1984 | Amin et al. . |
| 4,626,295 | 12/1986 | Sasaki et al. . |
| 4,651,540 | 3/1987 | Morse . |
| 4,675,971 | 6/1987 | Masserang . |
| 5,036,972 | 8/1991 | Cullen et al. .................... 206/204 |
| 5,054,549 | 10/1991 | Nakaguro .................... 165/133 |
| 5,071,174 | 12/1991 | Griffin et al. . |
| 5,080,051 | 1/1992 | Ando .................... 165/110 |
| 5,184,479 | 2/1993 | Koberstein et al. . |
| 5,215,660 | 6/1993 | Mosher et al. . |
| 5,245,842 | 9/1993 | Searfoss et al. . |
| 5,277,358 | 1/1994 | Cottone et al. . |
| 5,419,157 | 5/1995 | Kiblawi et al. . |

OTHER PUBLICATIONS

Drawing of Brazing Baffle dated Jan. 9, 1995 by Parker-Hannifin Corporation, Refrigeration and Air Conditioning Division.

Drawing of Receiver Dehydrator dated Jul. 12, 1995 by Parker-Hannifin Corporation Refrigeration and Air Conditioning System.

*Primary Examiner*—William Doerrler
*Attorney, Agent, or Firm*—John A. Molnar

[57] ABSTRACT

An accumulating vessel for use in a refrigeration system wherein a partially vaporized refrigerant is circulated therethrough. The vessel is constructed as a generally cylindrical housing having first and second end portions, and a body portion with a generally continuous circumferential inner surface, the portions together defining an internal chamber. An inlet tube opens into fluid communication with the internal chamber at a first location defining an inlet port, with an outlet tube opening into fluid communication with the internal chamber at a second location defining an outlet port. A baffle is received within the chamber intermediate the inlet and outlet ports for deflecting refrigerant from the inlet port over the outlet port. An outer surface of the baffle extends to an outer periphery configured to define at least a pair of contact surfaces with the inner surface of the body portion of the housing, and spacing the remainder of the periphery of the baffle a predetermined radial distance from the inner surface of the housing for the flow of refrigerant therebetween. The baffle is formed of a metal material having a layer of a metal alloy coated thereon forming at least a portion of the outer surface of the baffle including the contact surfaces. The metal alloy coating layer of the baffle is brazed to the inner surface of the housing along at least a portion of each of the contact surfaces joining the baffle to the housing.

17 Claims, 3 Drawing Sheets

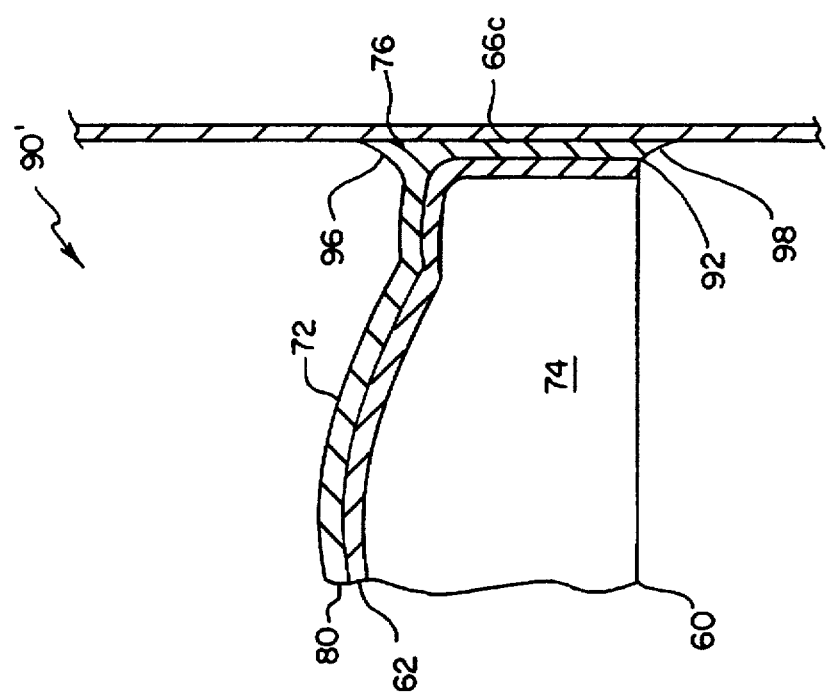
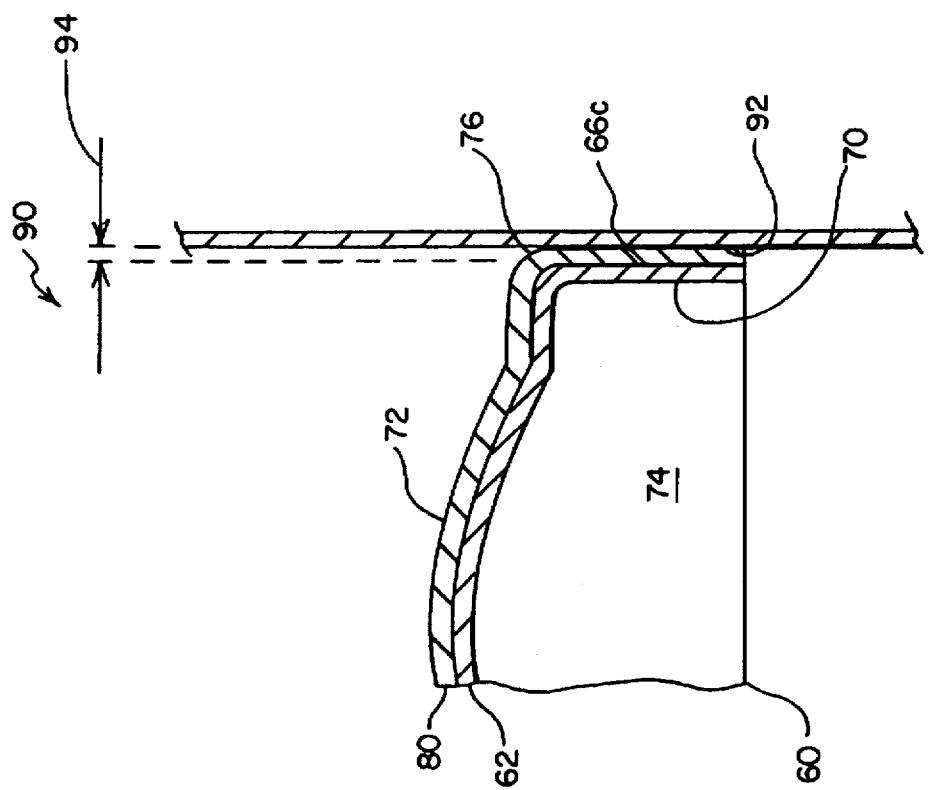

REFRIGERATION SYSTEM ACCUMULATING VESSEL HAVING A BRAZED, METAL-CLAD DEFLECTOR

This application claims the benefit of U.S. Provisional Application No. 60/010,813, filed Jan. 30, 1996.

BACKGROUND OF THE INVENTION

The present invention relates generally to refrigeration systems, and specifically to an accumulating vessel for use therein having a metal-clad baffle which is brazed to an inner surface of the housing of the vessel.

Automotive air conditioning and other refrigeration systems are operated in a thermodynamic cycle which conventionally employs, in series, a compressor, condenser, expansion device, and evaporator arranged in a closed-loop circuit. Within such a circuit, a refrigerant medium is cycled therethrough for its alternate conversion from a liquid to a gaseous state effecting a concomitant loss of heat. Accordingly, the refrigerant is provided as a compressible hydrofluorocarbon having a high latent heat of vaporization or, more recently, a non-halogenated hydrocarbon.

Energy is supplied into the thermodynamic cycle via the compressor which is operated as having a low pressure inlet or suction side and a high pressure outlet side. Within the compressor, the refrigerant is compressed and super heated to exit the outlet side thereof at a relatively high pressure. The refrigerant next is be passed through a condenser wherein a heat exchange is effected to remove the heat of compression from the refrigerant for its further cooling. From the condenser, the refrigerant, now in a liquefied and pressurized state, is expanded through the expansion device and then passed into the evaporator. The expanding refrigerant within the evaporator undergoes a state change from a high to a low pressure liquid, and subsequently a phase change to a low pressure gas. The specific and latent heats associated with the state and phase changes of the refrigerant effect the cooling of the area surrounding the evaporator or, with forced convective systems, of a cooling medium such as air which is circulated in a heat transfer relationship with the evaporator. From the evaporator the refrigerant, now in a relatively low pressure gaseous phase, is returned to the suction side of the compressor wherein it is again compressed and cooled for the repetition of the cycle.

Under unsteady conditions such as during startup, the refrigerant may exist as a liquid as it exits the evaporator. Also, during even steady-state operation, conditions may develop which flood the evaporator and cause liquid refrigerant to be returned to the compressor. The entry of liquid refrigerant into the suction side of the compressor is to be avoided, however, as being known to produce abnormally high operating pressures within the compressor or which, in turn, may damage gaskets, seals, valves, and the like.

Accordingly, in many refrigeration system, and particularly in vehicle air conditioning systems, an accumulating vessel such as an accumulator may be employed as a reservoir in which liquid refrigerant may be trapped and stored to prevent its being drawn into the suction side of the compressor. Conventionally, and as is illustrated by U.S. Pat. Nos. 5,419,157; 5,184,479; 4,675,971; 4,651,540; 4,474,035; 4,291,548; 4,208,887; 4,199,960; 4,194,371; 4,182,136; 4,111,005; and 4,041,728, the accumulator is incorporated within the fluid circuit of the refrigeration cycle intermediate the outlet side of the evaporator and the inlet side of the compressor. The accumulator receives the refrigerant from the evaporator as a two-phase mixture of a liquid and a gaseous component. Within the accumulator, the liquid and gas phase components of the refrigerant are separated prior to the return of the gas phase component to the compressor. The accumulator additionally may provide for the recovery of a lubricating oil which may be entrained within the refrigerant, and for the return of a metered amount of the oil to the inlet side of the compressor for the lubrication thereof. In short, the accumulator functions to allow only vapor and a small, metered amount of lubricating oil and/or refrigerant to be returned to the inlet side of the compressor.

Alternatively, and as is described in U.S. Pat. Nos. 5,245,842 and 4,458,505, the accumulating vessel may be operated at high pressure as incorporated into the refrigerant circuit intermediate the condenser, or the high pressure outlet side of the compressor, and the expansion valve. Termed a receiver dryer in such operation, the vessel receives the pressurized liquid refrigerant from the compressor and functions to filter contaminants such as particulates and moisture from the liquid. Irrespective of where disposed within the fluid circuit, however, both arrangements of accumulating vessels function to separate the liquid and gaseous components of the refrigerant.

In basic construction, accumulating vessels and particularly accumulators are fabricated as having a generally upright, cylindrical housing defining an integral chamber with an inlet port opening into fluid communication with an upper portion thereof. An outlet tube, which may be formed as having a generally U- or J-shaped configuration, is received within the housing as extending from a lower bend portion disposed within a lower portion of the chamber to an upper distal end which opens into fluid communication with the upper portion of the chamber to define an outlet port. Partially vaporized refrigerant is received through the inlet tube into the chamber of the accumulator, wherein the vapor phase portion of the refrigerant is collected in the upper portion of the chamber, while the liquid phase portion along with any entrained lubricating oil and/or moisture is drained to the lower portion of the chamber. The amount of the liquid phase component which is retained within the chamber is dependent upon the conditions, such as temperature and pressure, at which the cycle is operating. A desiccant preferably is provided within the chamber to dry the refrigerant as it is circulated through the accumulator. The vapor phase component is drawn out of the chamber through the outlet port of the U- or J-shaped outlet tube with the vacuum or suction pressure developed by the inlet side of the compressor. A metering device such as an oil return orifice filter or the like may be incorporated into the lower bend portion of the outlet tube to draw a measured amount of the collected lubricating oil and liquid refrigerant into the outlet tube for the lubrication of the downstream components.

For preventing liquid phase refrigerant from entering the outlet tube and being drawn into the inlet side of the compressor, as well as to assist in separating the liquid and gaseous phase components of the refrigerant, a deflector or other baffle member typically is provided as a shield over the outlet port or mouth of the outlet tube. For example, U.S. Pat. No. 4,474,035 discloses an accumulator constructed as having a domed baffle plate disposed intermediate an inlet port which opens into a top end of the housing and an outlet port which opens into an upper portion of the chamber as the distal end of a generally U-shaped outlet tube. The liquid phase component of the refrigerant thereby is directed onto the baffle plate, and then along the sides of the chamber to collect in the lower portion of the chamber. The gaseous or vapor component, in turn, is collected within an upper portion of the chamber.

Other representative baffle arrangements are illustrated in U.S. Pat. Nos. 4,675,971; 4,291,548; 4,199,960; 4,111,005 wherein accumulators having a side inlet port are shown. The incoming refrigerant is directed against a frustoconical-shaped outlet tube shield. U.S. Pat. No. 5,184,479 discloses an accumulator having a side inlet tube which extends into the internal chamber to a free end directing the incoming flow of refrigerant against a first end of the housing. An outlet tube extends within the internal chamber from a second end portion of the housing to a terminate at a distal end. An outlet tube shield is mounted around the free end of the inlet tube to cover the distal end of the outlet tube.

U.S. Pat. No. 4,041,728 discloses an accumulator having an apertured baffle plate which extends horizontally across an upper portion of the integral chamber above an inner end of the inlet tube. U.S. Pat. No. 4,651,540 discloses an accumulator having a generally cylindrical housing which includes top and bottom end walls defining a chamber. An inlet and an outlet are provide in the top end wall. A baffle is located in an upper portion of the chamber as surrounding the outlet to define confined, generally downwardly spiraling conduit for the refrigerant. U.S. Pat. No. 5,215,660 discloses filter dryer having an inlet for admitting refrigerant to a first end of an internal chamber defined by a housing, and an outlet tube for the exiting of refrigerant from a second end of the chamber. First and second disc-shaped baffles are positioned in a spaced-apart arrangement within the chamber. The baffles are perforated to allow the flow of refrigerant therethrough, and have a central opening through which the outlet tube extends. U.S. Pat. No. 5,419,157 discloses an accumulator having an integrated housing and baffle structure. The baffle is formed as an internal member configured as an inwardly-extending annular flange having a major diameter equal to the diameter of the housing and a minor diameter which is less than the major diameter.

Of particular interest to the operational efficiency and cost of manufacture of the accumulators of the type herein involved is the design and placement of the baffle within the interior chamber of the accumulator housing. With respect to the baffle arrangements shown, for example, in U.S. Pat. Nos. 4,474,035 and 5,184,479, it heretofore has been conventional practice to design the domed-shaped baffle as having a plurality of radially-disposed locating tabs or buttons which extending from the outer periphery of the baffle to effect an interference fit mounting with the inner surface of the internal chamber. With the housing partially assembled, the baffle is staked or press fit in place within the chamber of the housing. The resulting interference or contact points are fluxed, and a braze alloy in the form of a paste or the like is applied thereto. The assembly then is heated until the braze alloy is made to flow into the joint. However, as the deflector is pressed into place with little or no appreciable clearance between the locating tabs thereof and the inner surface of the chamber, it has been observed that there is often achieved a less than acceptable flow or wicking of the braze melt into the joint. Ultimately, the integrity of the bondline between the deflector and the housing is deleteriously affected which may lead to a premature shortening of the service life of the accumulator. Although the baffle alternatively may be spot welded to the inner surface of the housing, similar problems have been observed.

In view of the foregoing, it will be appreciated that improvements in the design, manufacture, and assembly of accumulator baffles would be well-received by industry. Especially desired would be designs and techniques which would provide for the positive positioning of the baffle, and for the bonding of the component parts in a single pass through a brazing furnace or the like.

SUMMARY OF THE INVENTION

The present invention is directed to a refrigeration system accumulating vessel, and particularly to a metal-coated baffle therefor which is brazable to an inner surface of the internal chamber which is defined by the vessel housing. The baffle is formed of a metal material and as having an outer periphery which is configured to define at least a pair of contact surfaces with the inner surface of the housing spacing the remainder of the periphery a predetermined radial distance from the inner surface. A metal alloy is coated on the baffle to form at least a portion of the outer surface thereof including the contact surfaces. The metal alloy is selected as having a liquidus temperature which is below the melting temperature of the metal material. The baffle is receivable within the housing of the vessel such that the contact points of the outer surface are disposed in an abutting engagement with the inner surface of the housing. The metal alloy coating layer then may be heated to a temperature which is above its liquidus temperature but below the melting point of the metal material for a time sufficient to liquefy at least a portion of the alloy coated on the contact surfaces of the outer surface of the baffle. Upon cooling of the coating layer, at least a portion if the contact surfaces of the baffle are joined to the inner surface of the housing.

Advantageously, the metal coating layer which forms the outer surface of the baffle provides for the positive position of the baffle within the housing of the vessel. That is, as the coating layer on the contact surfaces of the outer surface of the baffle provides a predetermined gap or clearance between the inner surface of the housing and the underlying metal substrate which forms the remainder of the baffle. Such gap allows for an adequate melt flow within the joint ensuring an integral bondline between the baffle and the housing. Moreover, in forming the baffle as having an integral coating thereon, the introduction of a braze material into the joints may be eliminated as a separate step in the assembly of the accumulator.

It therefore is a feature of the present invention to provide an accumulating vessel for use in a refrigeration system wherein a partially vaporized refrigerant is circulated therethrough. The vessel is constructed as a generally cylindrical housing having first and second end portions, and a body portion with a generally continuous circumferential inner surface, the portions together defining an internal chamber. An inlet tube opens into fluid communication with the internal chamber at a first location defining an inlet port, with an outlet tube opening into fluid communication with the integral chamber at a second location defining an outlet port. A baffle is received within the chamber intermediate the inlet and outlet ports for deflecting refrigerant from the inlet port over the outlet port. An outer surface of the baffle extends to an outer periphery configured to define at least a pair of contact surfaces with the inner surface of the body portion of the housing spacing the remainder of the periphery of the baffle a predetermined radial distance from the inner surface of the housing for the flow of refrigerant therebetween. The baffle is formed of a metal material having a layer of a metal alloy coated thereon forming at least a portion of the outer surface of the baffle including the contact surfaces. The metal alloy coating layer of the baffle is brazed to the inner surface of the housing along at least a portion of each of the contact surfaces joining the baffle to the housing.

It is a further feature of the invention to provide a method of joining a baffle of an accumulating vessel to the housing thereof. The housing is generally cylindrical and includes first and second end portions, and a body portion with a generally continuous circumferential inner surface, the portions together defining an internal chamber. An inlet tube opens into fluid communication with the internal chamber at a first location defining an inlet port, with an outlet tube opening into fluid communication with the integral chamber at a second location defining an outlet port. The baffle is disposable within the chamber intermediate the inlet and outlet ports for deflecting refrigerant from the inlet port over the outlet port. An outer surface of the baffle extends to an outer periphery configured for defining at least a pair of contact surfaces with the inner surface of the body portion of the housing spacing the remainder of the periphery of the baffle a predetermined radial distance from the inner surface of the housing for the flow of refrigerant therebetween. The baffle is provided as being formed of a metal material having a layer of a metal alloy coated thereon forming at least a portion of the outer surface of the baffle including the contact surfaces. The metal alloy is selected as having a liquidus temperature which is lower than the melting point of the metal material. The metal alloy layer is heated to a temperature which is higher than the liquidus temperature of the alloy, but lower than the melting point of the metal material for a time sufficient to liquefy at least a portion of the alloy coated on the contact surfaces of the outer surface of the baffle. The layer then is cooled to solidify the liquefied alloy and thereby join at least a portion of the contact surfaces of the outer periphery of the baffle to the inner surface of the housing.

Advantages of the present invention include a baffle construction which provides for the positive positioning of the baffle with the housing of an accumulating vessel, and for the joining of the baffle thereto along with other component parts in a single pass through brazing operation or the like. Additional advantages include a baffle construction which is economical to manufacture and assemble, and which ensures the integral bonding of the baffle to the inner surface of the vessel housing. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein:

FIG. 4A is a cross-sectional, schematic view illustrating in enlarged detail a joint prior to heating between one of the contact surfaces of the baffle of FIG. 1 and a corresponding portion of the inner surface of the accumulator housing; and FIG. 4B is a cross-sectional, schematic view illustrating in enlarged detail the joint of FIG. 4B after heating.

Figure 1:
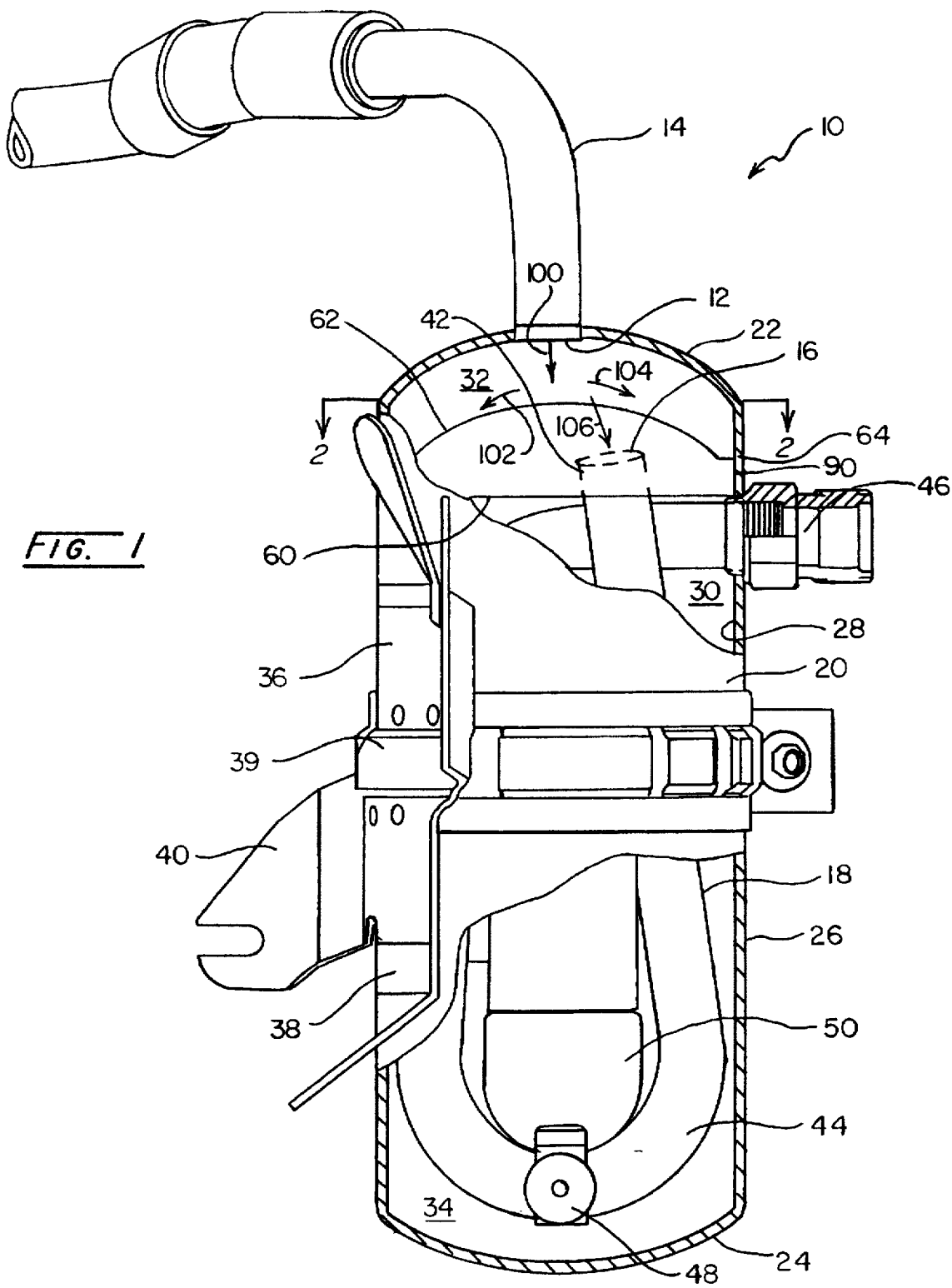
FIG. 1 is a partially sectional, side elevational assembly view of an accumulator having a metal-alloy-coated integral baffle member which is brazed to an inner surface of the accumulator housing in accordance with the precepts of the present invention.

The drawings will be described further in connection with the following Detailed Description of the Invention.

DETAILED DESCRIPTION OF THE INVENTION

For the illustrative purposes of the discourse to follow, the precepts of the invention herein involved are described in connection with an accumulating vessel which is shown to be an accumulator configured for fluid connection within a refrigeration circuit intermediate an evaporator and the low pressure inlet side of a compressor. It will be appreciated, however, that aspects of the present invention may find utility in the fabrication of accumulators having constructions which differ from that illustrated in the accompanying figures, and of other refrigeration vessel configurations including receiver dryers and the like designed for fluid connection intermediate the high pressure outlet side of a compressor and an expansion valve.

Referring then to the figures wherein corresponding reference characters are used to designate corresponding elements throughout the several views, a representative accumulating vessel for use in conjunction with the present invention is shown generally at 10. Vessel 10 is configured as an accumulator for use in a refrigeration cycle as in an automotive air conditioning system. Such systems conventionally involve a thermodynamic circuit which may include, as is shown schematically in U.S. Pat. Nos. 5,245,842 and 5,419,157, a compressor, condenser, expansion device, and evaporator coupled in a series fluid communication. In this regard, accumulator 10 includes an inlet port, 12, which is couplable in fluid communication with an evaporator (not shown) via an inlet tube, 14, and an outlet port, shown in phantom at 16, which is couplable in fluid communication with the inlet side of a compressor (not shown) via an outlet tube, 18.

Accumulator 10 additionally includes a generally cylindrical housing, 20, having domed or inwardly-convex first and second end portions, 22 and 24, and a tubular body portion, 26, with a generally continuous circumferential inner surface, 28. Together, housing portions 22, 24, and 26 define an internal chamber, represented at 30, having an upper and a lower axial portion, 32 and 34, respectively. Chamber 30, in turn, defines a reservoir for the accumulation of partially-vaporized refrigerant which is received from the evaporation via inlet tube 14 and inlet port 12. Preferably, housing 20, which may be of an aluminum construction, is provided as formed of an upper and a lower half, 36 and 38, to facilitate assembly of the component parts to be received therein. Upper and lower halves 36 and 38 may be joined by brazing to form a fluid-fight juncture as is shown at 39. A bracket assembly, 40, may be provided for the attachment of housing 30 to the chassis of a vehicle or the like.

Inlet tube 14 extends from fluid connection with an evaporator (not shown) to open into fluid communication with chamber 30 at a first location defining inlet port 12. Preferably, inlet port 12 is provided to open into upper axial portion 32 of chamber 30 though first end portion 22 of housing 20 although, depending upon space and mounting constraints, a side or lateral opening may be provided though body portion 26. Outlet tube 18, which may be of a generally J-shaped design as is shown, likewise opens into fluid communication with upper axial portion 32 of chamber 30. In this regard, outlet tube 18 may be provided as being of a generally J-shaped configuration received within chamber 20 as extending generally downwardly from an upper distal end, shown in phantom at 42, defining outlet port 16 at a second location within chamber upper axial portion 32 to a lower bend portion, 44, located within chamber lower axial portion 34 adjacent housing second end portion 24. From its lower bend portion, outlet tube 18 then extends generally upwardly and through housing body portion 26 to an external proximal end, 46, which is couplable to the inlet side of a compressor (not shown). An oil return orifice and filter assembly, referenced generally at 48, may be incorporated within lower bend portion 44 of outlet tube 18 for the return of a metered amount of lubricating oil to the compressor. Additionally, a desiccant bag assembly, 50, may be disposed within chamber 30 for the adsorption of moisture which may be entrained within the refrigerant being circulated through accumulator 10.

Figure 2:
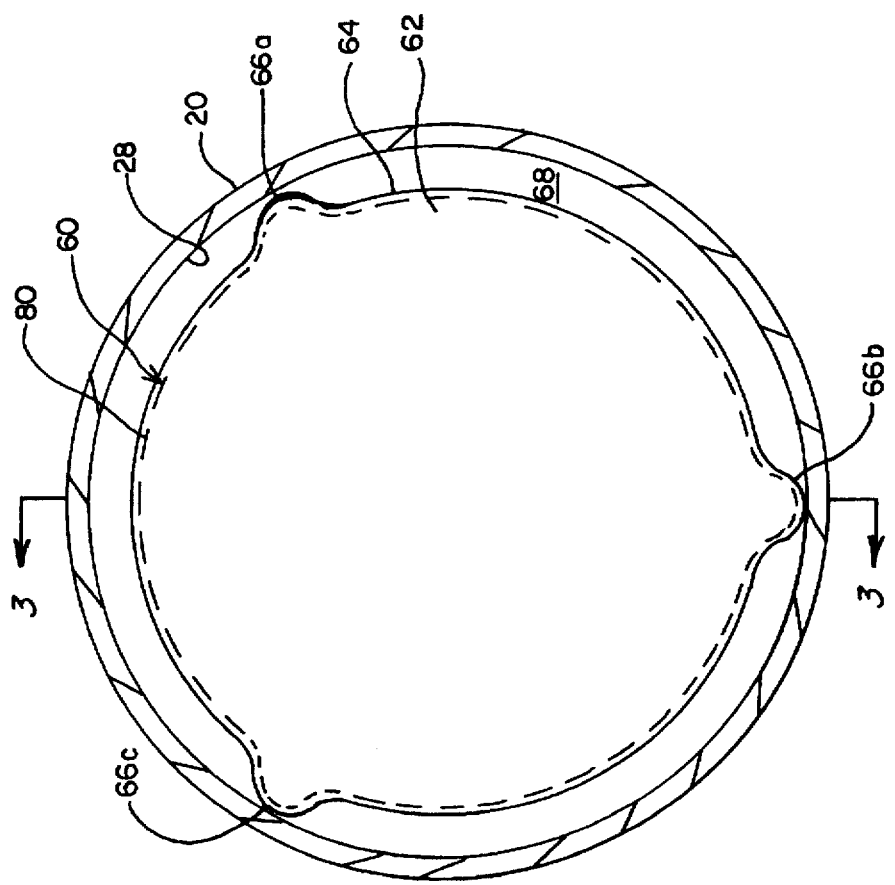
FIG. 2 is a cross-sectional view taken through line 2—2 of FIG. 1 showing the baffle of the present invention in enhanced detail.

A deflector or baffle, 60, is received within chamber 30 intermediate inlet port 12 and outlet port 16 for preventing liquid phase refrigerant received through inlet port 12 from directly entering outlet tube 18 and being drawn into the inlet side of the compressor. Looking additionally to FIG. 2, baffle 60 may be seen to be configured to generally conform to the cross-sectional shape of chamber 30, and as having an outer surface, 62, extending to an outer periphery, 64. Outer periphery 64, in turn, is configured to define at least a pair of contact surfaces, three of which are illustrated in FIG. 2 at 66a–c, with inner surface 28 of housing 20. Contact surfaces 66 space the remainder of the periphery 64 of baffle 60 a predetermined radial distance from the inner surface 28 of housing 20 to define a generally annular gap, represented at 68 in FIG. 2, for the flow of liquid phase refrigerant therebetween.

Figure 3:
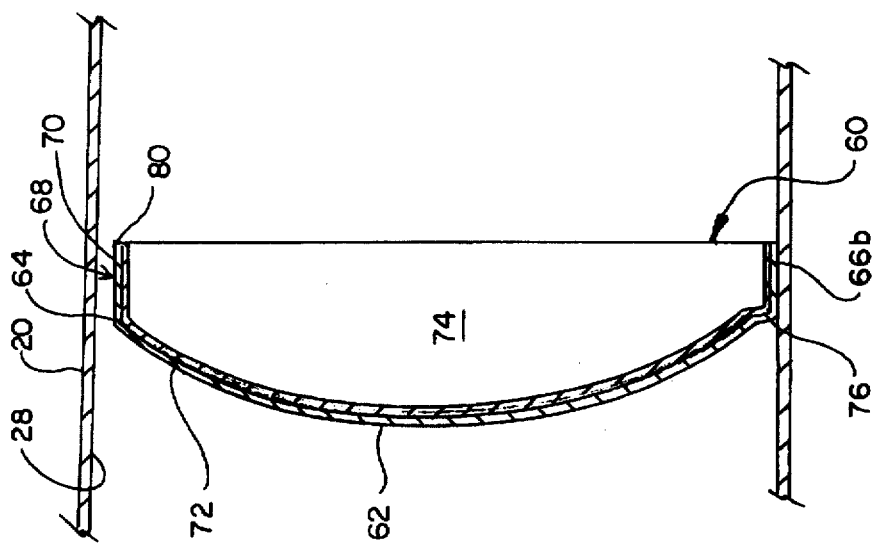
FIG. 3 is a cross-section view of the baffle of FIG. 2 taken through line 3—3 of FIG. 2.

Referring next to FIG. 3, a preferred embodiment of baffle 60 according to the present invention is shown with outer periphery 64 thereof being configured as a generally cylindrical lower portion, 70, which is of a select axial length and extends to a domed upper portion, 72. Domed upper portion 72 defines a generally convex interior space, represented at 74, which, as may be seen through momentary reference to FIG. 1, receives distal end 42 of outlet tube 18 thereunder. In this regard, baffle 60 shields outlet port 16 by deflecting liquid phase refrigerant received through inlet port 12 through gap 68 for flow along the inner surface 28 of housing 20. As is shown at 76 for contact surface 66b, contact surfaces 66 preferably are integrally-formed in outer periphery 64 as a plurality of radially-disposed splined portions, each of which extends outwardly to inner surface 28 of housing 20 along at least part of the axial length of baffle cylindrical lower portion 70. In this regard, baffle 60 may be stamped or otherwise formed of a metal material such as a Type-3003 aluminum alloy.

In accordance with the precepts of the present invention, and as is shown in FIG. 3 and in phantom in FIG. 2, additionally is provided as having a coating layer, 80, of a metal alloy which forms at least a portion of outer surface 62 including contact surfaces 66. Layer 80, which preferably is coated on baffle 60 to a thickness of about 75 microns (3 mils), is selected as having a liquidus temperature which is lower than the melting temperature of the metal substrate material which forms the core of baffle 60. In this regard, an aluminum braze alloy composition, such as a Type-4343 comprising, by weight, a eutectic alloy of from about 6.8–8.2% silicon, 0.8% iron, 0.25% copper, 0.10% manganese, and 0.20% zinc, has been found suitable as exhibiting a liquidus temperature of about 613° C.(1135° F.).

Layer 80 may be coated on baffle 60 by any of several conventional processes including cladding, chemical vapor deposition (CVD), electrolytic plating, evaporation, sputtering, plasma coating, fused salt bath coating, pack diffusion, or vacuum deposition. A sold-state fusion process such as cladding, however, is to be considered preferred. As is generally known, cladding involves the hot rolling of a laminate sheet for the joining of a cladding sheet or sheets to a substrate, core, or the like.

Continuing with FIGS. 2 and 3 and looking additionally to FIG. 4A wherein detail 90 of FIG. 1 is shown in an enlarged, cross-sectional, partially-schematic view, with baffle 60 being formed as has been described, it may be disposed within chamber 30 of accumulator 10 such that contacts points 66 are received in an abutting relationship with inner surface 28 of housing 20. In this regard, as may be best appreciated with reference to FIG. 4A, metal coating layer 80 forming baffle outer surface 62 provides for the positive positioning of baffle 60 within the housing 20. That is, the thickness of the portion of layer 80 which is coated on surfaces 66 spaces the underlying surface, represented at 92, of the core portion of baffle 60 as providing a predetermined clearance, referenced at 94, between surface 92 and housing inner surface 28. Upon the heating of coating layer 80 to a temperature which is above its liquidus temperature, and as is shown in FIG. 4B wherein detail 90 is shown after heating at 90', clearance 94 allows for an adequate melt flow within the joint ensuring an integral bondline between baffle 60 and housing 20 as defined by fillets 96 and 98. Moreover, in forming baffle 60 as having an integral coating layer 80 provided thereon, the introduction of a braze material or the like into the interference joints between baffle contact surfaces 66 and housing inner surface 28 may be eliminated as a separate step in the assembly of accumulator 10.

The brazing of baffle 60 to housing 20 may be effected under conditions which may be considered conventional for aluminum materials, such conditions being more fully described in U.S. Pat. Nos. 4,626,295; 5,277,358; and 5,071,174. In general, the brazing process entails assembling accumulator 10 with baffle 60, as constructed in accordance with the present invention, being received within housing 20 in an interference or press-fit engagement mating the metal-coated outer surface 62 of baffle 60 with inner surface 28 of housing 20. Baffle 60 optionally may be subjected to degreasing operations prior to the assembly of accumulator 10, and following assembly fluxed with a commercially-available fluxing compound which may be applied using a syringe or other dispenser. The fluxed assembly of accumulator 10 then may be placed in a conveyor or batch brazing furnace and heated to a temperature of from about 1100°–1150° F.(590°–620° C.), for a dwell time of from about 10 to 20 minutes. In a conveyor-type furnace, a conveyor speed of about 12 inches/min (0.5 cm/sec) may be utilized.

The conditions under which the assembly is heated are selected to raise the temperature thereof to above the solidus temperature of the coating layer 80 but below the melting point of the metal substrate material forming the core of baffle 60. Preferably, the temperature of the assembly is raised to just above the liquidus temperature oft he coating layer, and is maintained for so long as is necessary to provide for the flow thereof in clearance 94 by capillary action or the like. Upon the cooling-induced re-solidification of coating layer 80, fillets 96 and 98 may be formed ensuring an integral bondline between baffle 60 and housing 20. Advantageously, other component parts such as fitting 46 and tube 14, additionally may heated and joined in the same brazing operation to further facilitate the manufacture of accumulator 10.

Lastly, the operational aspects of accumulator 10 are summarized with general reference to FIG. 1 as incorporated into a conventional refrigeration circuit. Within the circuit, vapor phase refrigerant is supplied to a compressor for compression and pressurization. From the compressor, the refrigerant is provided under pressure to a condenser wherein the heat of compression is removed to condense the refrigerant into a pressurized liquid. The now liquid phase refrigerant is expanded through an expansion valve for a pressure drop, and then is passed into an evaporator wherein the expanding refrigerant is partially vaporized. From the evaporator, the refrigerant, now a two-phase mixture of liquid and vapor components, is directed through inlet tube inlet tube 14 of accumulator 10. Through inlet port 12 which opens into upper axial portion 32 of internal chamber 30, the refrigerant, as is represented by arrows 100, 102, and 104, is impinged against the outer surface 62 of baffle 60 for separation into liquid and gas phase constituents. The gas phase component is collected within chamber upper axial portion 32, and is drawn, as is represented at 106, for return to the inlet side of the compressor through outlet port 16 of outlet tube 18.

The denser liquid phase component is directed over outlet port 16 and along housing inner surface 28 through the annular gap 68 defined between housing 20 and baffle periphery 64. Ultimately, the component is collected within chamber lower axial portion 34 to define an interface with the vapor phase component at a level which depends upon certain operating conditions such as temperature and pressure. Water, oil, and particulates which may be entrained within the refrigerant additionally are collected within lower axial portion 34. With the water being adsorbed by desiccant assembly 50, the oil and particles may form a separate bottom phase depending upon their miscibility with the liquid refrigerant. A metered amount oil and liquid refrigerant is drawn through orifice assembly 48 to be mixed with vapor phase refrigerant within outlet tube 18 for the lubrication of downstream components. Orifice assembly 48 may include a filter (not shown) to screen particulates from entering outlet tube 18 with the lubrication oil.

Thus, a unique accumulator construction is described which provides for the improvement attachment of the baffle to the housing. Such construction additionally facilities and simplifies assembly, and is economical to manufacture.

As it is anticipated that certain changes may be made in the present invention without departing from the precepts herein involved, it is intended that all matter contained in the foregoing description shall be interpreted in as illustrative rather than in a limiting sense. All references cited herein are expressly incorporated by reference.

What is claimed:

1. In an accumulating vessel for use in a refrigeration system wherein a partially vaporized refrigerant is circulated therethrough, said vessel having an inlet port for receiving the refrigerant and an outlet port for passing the refrigerant from said vessel and comprising: a generally cylindrical housing having first and second end portions, and a body portion with a generally continuous circumferential inner surface, said portions together defining an internal chamber; an inlet tube opening into fluid communication with said internal chamber at a first location defining said inlet port; an outlet tube opening into fluid communication with said internal chamber at a second location defining said outlet port; and a baffle disposable within said chamber intermediate said inlet port and said outlet port for deflecting refrigerant from said inlet port over said outlet port, said baffle having an outer surface extending to an outer periphery configured for defining at least a pair of contact surfaces with the inner surface of the body portion of said housing spacing the remainder of the periphery of said baffle a predetermined radial distance from said inner surface for the flow of said refrigerant therebetween, a method of joining said baffle to said housing comprising the steps of:

(a) providing said baffle as being formed of a metal material having a layer of a metal alloy coated on at least a portion of the outer surface of said baffle including said contact surfaces, said metal alloy selected as having a liquidus temperature below the melting point of said metal material;

(b) disposing said baffle within said housing to receive the metal alloy coated contact surfaces of said baffle in an abutting engagement with the inner surface of the body portion of said housing whereby the metal alloy layer coated on said contact surfaces is interposed between said contact surfaces and the inner surface of the housing body portion to provide a predetermined clearance between said contact surfaces and the inner surface of the housing body portion;

(c) heating said metal alloy layer to a temperature which is above the liquidus temperature of said alloy and below the melting point of said metal material for a time sufficient to liquefy at least a portion of said alloy coated on the contact surfaces of the outer surface of said baffle; and (d) cooling said layer to solidify the liquefied alloy joining at least portion of the contact surfaces of the outer periphery of said baffle to the inner surface of said housing.

2. The method of claim 1 wherein said layer of said metal alloy is heated in step (c) to a temperature which is between about 1100°–1150° F.(590°–620° C.).

3. The method of claim 1 wherein said layer of said metal alloy is heated in step (c) for about 10 to 20 minutes.

4. The method of claim 1 wherein said metal material of step (a) forming said baffle comprises aluminum.

5. The method of claim 1 wherein said layer of said metal alloy of step (a) is coated on said baffle to a thickness of about 3 mils (75 microns).

6. The method of claim 1 wherein said metal alloy of said layer of step (a) comprises aluminum and silicon.

7. The method of claim 1 further comprising an additional step prior to step (c) of applying a fluxing compound to at least a portion of the outer surface of said baffle including said contact surfaces.

8. The method of claim 1 wherein said baffle is provided in step (a) with said outer periphery being configured as a generally cylindrical lower portion which extends to a domed upper portion defining a generally convex interior configured for receiving said outlet port therewithin.

9. The method of claim 8 wherein said baffle is provided in step (a) with said contact surfaces being integrally-formed in the outer periphery of said baffle as radially-disposed splined portions, each of which extends outwardly to the inner surface of said housing along at least part of the axial length of the lower portion of said baffle.

10. The method of claim 1 wherein said baffle is provided in step (c) with said layer of said metal alloy being clad to said metal material forming said baffle.

11. An accumulating vessel for use in a refrigeration system wherein a partially vaporized refrigerant is circulated therethrough, said vessel having an inlet port for receiving the refrigerant and an outlet port for passing the refrigerant from said vessel and comprising:

a generally cylindrical housing having first and second end portions, and a body portion with a generally continuous circumferential inner surface, said portions together defining an internal chamber;

an inlet tube opening into fluid communication with said internal chamber at a first location defining said inlet port;

an outlet tube opening into fluid communication with said internal chamber at a second location defining said outlet port; and a baffle received within said chamber intermediate said inlet port and said outlet port for deflecting refrigerant from said inlet port over said outlet port, said baffle having an outer surface extending to an outer periphery configured to define at least a pair of contact surfaces with the inner surface of the body portion of said housing spacing the remainder of the periphery of said baffle a predetermined radial distance from said inner surface for the flow of said refrigerant therebetween, and said baffle being formed of a metal material having a layer of a metal alloy coated on at least a portion of the outer surface of said baffle including said contact surfaces whereby the metal alloy layer coated on said contact surfaces is interposed between said contact surfaces and the inner surface of the housing body portion providing a predetermined clearance between said contact surfaces and the inner surface of the housing body portion and brazing at least a portion of said contact surfaces to said inner surface of said housing along at least a portion of each of said contact surfaces joining said baffle to said housing.

12. The vessel of claim 1 wherein said metal material forming said baffle comprises aluminum.

13. The vessel of claim 1 wherein said layer of said metal alloy coated on said baffle has a thickness of about 3 mils (75 microns).

14. The vessel of claim 1 wherein said metal alloy of said layer coated on said metal material forming said baffle comprises aluminum and silicon.

15. The vessel of claim 1 wherein the outer periphery of said baffle is configured as a generally cylindrical lower portion which extends to a domed upper portion defining a generally convex interior receiving said outlet port therewithin.

16. The vessel of claim 15 wherein said contact surfaces of said baffle are integrally-formed in the outer periphery thereof as radially-disposed splined portions, each of said splined portions extending outwardly to the inner surface of said housing along at least part of the axial length of the lower portion of said baffle.

17. The vessel of claim 1 wherein said layer of said metal alloy is clad to said metal material forming said baffle.

* * * * *